Patented Nov. 4, 1952

2,616,889

UNITED STATES PATENT OFFICE 2,616,889

CONDENSATION PRODUCTS OF THE SUGARS WITH DERIVATIVES OF ESCULETOL AND PROCESS

Léon Velluz, Paris, and Gaston Amiard, Romainville, France, assignors to Les Usines Chimiques des Laboratoires Francais, Romainville, France, a corporation of France No Drawing. Application May 5, 1949, Serial No. 91,636. In France July 5, 1948

3 Claims. (Cl. 260—210)

This invention comprises osides obtained by condensation of sugars with alkyl or aryl-4 derivatives of esculetol and their preparation.

Esculetol or dihydroxy-6,7 coumarin is the aglycone of a natural glucoside, esculin or esculoside, having the formula

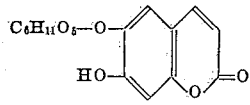

that is extracted from the bark of the chestnut tree of India and known for its vitamin P property and its remarkable fluorescence that makes it useful as a filter of solar light. Esculetol itself has also been employed for its absorbent properties, but it is devoid of vitamin P activity.

The applicants have, however, found vitamin P properties in methyl-4-esculetol, equally useful in solar light filters, and of which no oside has heretofore been described.

These osides have the general formula

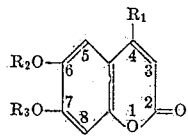

where $R_1$ represents an alkyl or aryl radical, $R_2$ an osidic radical of for example $C_6H_{11}O_5$, and $R_3$ an atom of hydrogen, an alkyl, aryl or acyl radical, as for example, $CH_3$—, $C_6H_5CH_2$—, $CH_3CO$—, or the reverse for $R_2$ and $R_3$.

The advantage presented by these osides over the manufacture of glucosides of esculetol is that the basic matter, the alkyl- or aryl-4 esculetol, is much more easily obtainable by synthesis than is esculetol itself of which a preparation following the method of Von Pechmann was described by G. Amiard and A. Allais (Bull. Soc. Chim., 1947, 14, 512).

The preparation of the alkyl- or aryl-4 esculetol can be effected following the method described in Organic Synthesis, collective volume 1, p. 352 for methyl-4 esculetol. The fixation of the osidic residue in position 7 is obtained by methods comparable to those that have permitted the transformation of esculetol to cichoriine and described by E. Glaser and M. Kraus (Biochem. Z. 1923, 138, 183), by F. S. Head and A. Robertson (J. Chem. Soc., 1930, 2434), by R. Seka and P. Kallin (Ber. dtsch. Chem. Ges., 1931, 64, 622) and by K. W. Merz (Arch. pharm. Ber. dtsch. pharm. Ges., 1932, 270, 476).

The fixation of the osidic residue to the contrary takes place in position 6 when following the method concisely given by K. W. Merz and W. Hagemann (Naturwiss., 1941, 29, 650) and repeated in detail by G. Amiard and G. Nomine (Bull. Soc. Chim., 1948, 15, 476) for the preparation of esculosides from esculetol.

The different steps in the preparation of products according to the invention are the following:

One of the phenol groups of the alkyl- or aryl-4 esculetol is blocked either by esterification in position 6 or by etherification in position 7, and the resulting product is treated with acetylated sugar, for example the pentaacetyl-glucose or one of its substituted products, α-aceto-bromo-glucose, nitro-aceto-glucose, etc. The oside obtained is de-acetylated catalytically in an alcohol in the presence of an alkali, or by an entirely different procedure, for example, by saponification in any aqueous or alcoholic alkaline solution. If an oside is desired in which the second phenol group is free, this functional group is previously blocked by a residue readily replaceable by hydrogen, as for example, a benzyl group, $C_6H_5$—$CH_2$—.

These novel osides find application in medicines for humans and animals inasmuch as they have vitamin P properties or in solar filters due to their power of absorbing luminous radiations.

Hereinafter there is given, by way of example but not limited thereto, the preparation of methyl-4 β-d-gluco-pyranosidoxy-6 benzyl-oxy-7 coumarin or methyl-4 esculetol glucoside (6 position) benzylated in the 7 position, and of methyl - 4β - d - glucopyranosidoxy - 6 hydroxy-7 coumarin or methyl-4 esculoside. The following Formulas 1, 2 and 3 are those of the intermediates and formulas 4 and 5 are those of the above-mentioned products:

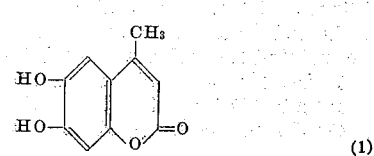

(1)

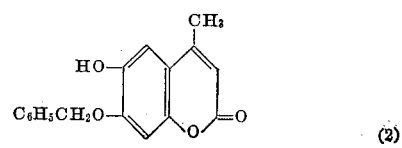

(2)

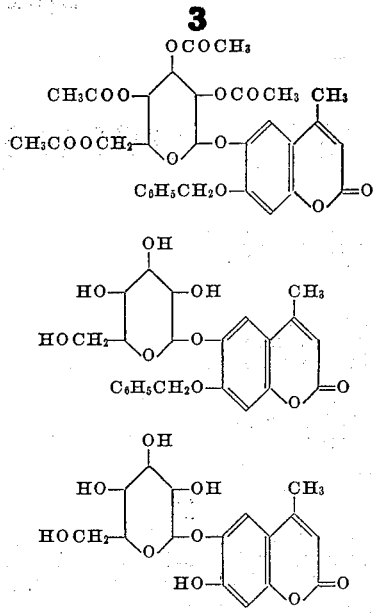

*Example*

For the preparation of the above-mentioned compounds the following are the steps:

*First step.*—Obtaining methyl-4 esculetol benzylated (7) (Formula 2).

There is heated to reflux during one hour 17.8 gms. of methyl-4 esculetol (Formula 1), 135 cc. of alcoholic caustic soda (3.4%), 54 cc. of water and 25 gms. of benzyl chloride, and the alcohol is distilled under reduced pressure. The residue is extracted by means of chloroform, separating from the methyl-4 esculetol which has not reacted (4.3 gms. or 27%); the latter is filtered and washed with chloroform. The mother-chloroform solution and the washing chloroform is washed with a solution of 10% sodium carbonate, in order to eliminate the last traces of methyl-4 esculetol, and with a normal solution of caustic soda to extract the mono-benzyl-methyl-4 esculetol. By acidifying with hydrochloric acid the soda washing solution, there is precipitated the methyl-4 esculetol benzylated in position 7 (Formula 2), which is filtered, washed with water and dried to 80° C. After recrystallization in dichlorethane, there remains 12 gms. (46%), fusion point 200° C. (instantaneous).

*Second step.*—Obtaining methyl-4 esculetol tetra-acetyl-glucoside (6) benzylated (7) (Formula 3).

There is permitted to react at room temperature 9 gms. of aceto-bromo-glucose with 5 gms. of the benzylated (7) methyl-4 esculetol (Formula 2) dissolved in 11 cc. of 2N-caustic soda, 11 cc. of water and 45 cc. of acetone. The glucoside crystallizes. It is filtered, washed with dilute caustic soda, with water, with alcohol, and dried to 80° C. Result is 4.7 gms. (43%) fusion point 195° C. (instantaneous). $(a)_D = -19.5° \pm 1°$ (pyridine, $c=3\%$). By acidification of the washing soda solution there is recovered 1.7 gms. of benzylated methyl-4 esculetol (34%).

*Third step.*—Obtaining of methyl-4 esculetol glucoside (6) benzylated (7) (Formula 4).

Of the preceding product 4 gms. in a suspension of 40 cc. boiling methanol are rapidly de-acetylated by the addition of 4 cc. of methanolic potash (1%). It is cooled, neutralized by a little acetic acid, and the alcohol and methyl acetate formed are driven off. The residual oil, recovered with a little alcohol, crystallizes very rapidly. The crystals of methyl-4 esculetol glucoside (6) and benzylated (7) are filtered and washed with alcohol and then acetone.

Result: 2.85 gms. (practically quantitative) of the product crystallized with one molecule of water which is lost at 150° C. under vacuum; fusion point 170° C. (instantaneous), $$(a)_D = -10° \pm 1°$$

(pyridine $c=3\%$). It is insoluble in water and alkaline solutions, soluble in methanol and pyridine.

*Fourth step.*—Obtaining of methyl-4 esculetol glucoside (6) (Formula 5).

There is agitated in an atmosphere of hydrogen 2 gms. of methyl-4 esculetol glucoside (6) benzylated (7) (Formula 4) in 50 cc. of methanol with 0.5 gm. palladium black (6% palladium). A rapid absorption of a molecule of hydrogen occurs. It is heated to boiling, the palladium black is filtered and washed with boiling methanol. The methyl-4 esculoside crystallizes on cooling. It is filtered and washed with methanol.

Result: 1.30 gms. (82%) of product dried at 130° C. under vacuum and retaining one molecule of water of crystallization. It melts at 160° C. with loss of water of crystallization $$(a)_D = -35° \pm 1.5°)$$

(pyridine $c=2\%$). It is slightly soluble in water, methanol and alcohol, soluble in pyridine and alkaline solutions.

What is claimed is:

1. 6-glucoside of methyl-4 esculetol.

2. In a process of preparing the 6-glucoside of methyl-4-esculetol, the steps comprising blocking the 7-phenol group of said methyl-4-esculetol, treating the resulting reaction product with acetylated gulcose, and de-acetylating and deblocking the phenol group in the resulting 6-glucosido-4-methyl esculetol compound.

3. In a process of preparing the 6-glucoside of methyl-4-esculetol by benzylation of the 7-phenol group, reacting the resulting 7-benzylated compound with acetylated glucose, and de-acetylating and de-benzylating the glucoside compound formed, the step comprising heating under reflux methyl-4-esculetol in aqueous-alcoholic alkali hydroxide solution with an excess of benzylchloride to form 7-benzyl-methyl-4-esculetol.

LÉON VELLUZ.
GASTON AMIARD.

REFERENCES CITED

The following references are of record in the file of this patent:

Von Pechmann et al.: Ber. 34 (1901), pp. 423–4.
Head et al.: JCS, 1939, pp. 1266–1267.
Hackh's Chemical Dictionary, 1944.
Amiard et al.: Bull. Soc. Chim. Fr., 1948, pp. 476–479.